Dec. 16, 1941.       E. H. KRUSE       2,266,643
FISH POLE COUPLING
Filed March 7, 1940
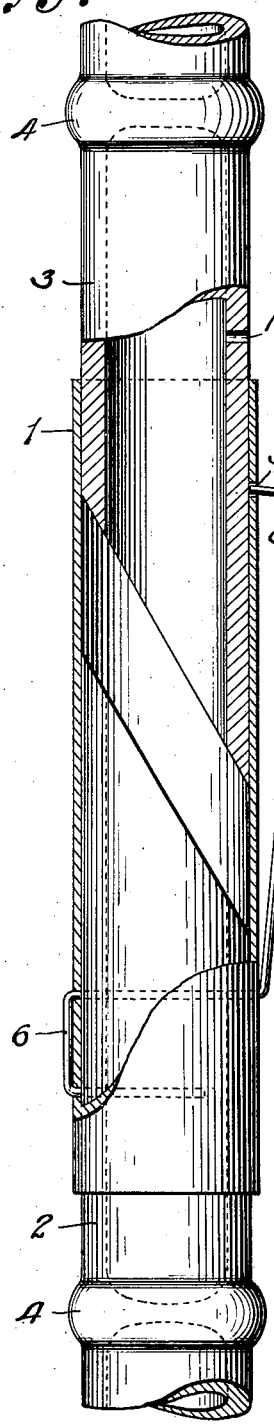
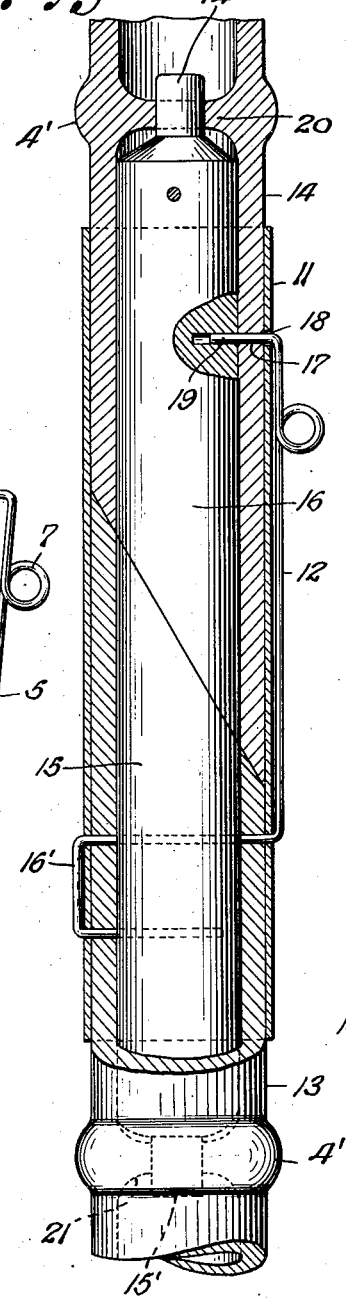
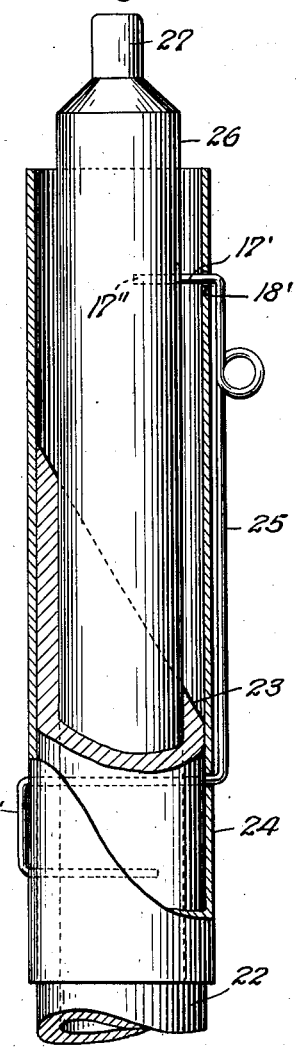
Inventor
Edward H. Kruse
By H. G. Evans
Attorney Patented Dec. 16, 1941

2,266,643

UNITED STATES PATENT OFFICE 2,266,643

FISH POLE COUPLING

Edward H. Kruse, Fort Wayne, Ind.

Application March 7, 1940, Serial No. 322,734

2 Claims. (Cl. 287—119)

This invention relates to couplings for fish pole sections and is applicable to ordinary bamboo and cane poles, such as are in common use, or any other similar tubular or solid structure.

An object of the invention is to provide a coupling for pole sections adapted to readily connect and disconnect said sections whereby is facilitated portability when the sections are disconnected, and stability of the pole when the sections are connected.

Another object of the invention is to afford a coupling for pole sections that is easily applied to an ordinary tubular pole and which is efficient in operation as well as economic of manufacture.

Other objects and advantages of the invention appear in the following description.

An illustrative embodiment of the invention is shown in the accompanying drawing, in which:

Fig. 1 is an elevational view, partially in section, of a structure showing a coupling in which the invention is incorporated, the pole sections being partially separated;

Fig. 2 is a similar view of a modified form of the invention, the pole sections being in connected position; and Fig. 3 is an elevational view, partially in section, of another modified form of the invention showing the coupling and one of the pole sections to which the coupling is permanently connected.

The illustrative embodiment of the invention consists of a metallic ferrule 1 into which is projected the end of a pole section 2 that extends part way through the ferrule. Also, there is removably projected into the ferrule the opposing end of another pole section 3 in axial alinement with the ferrule and the other pole section.

In applying the invention, an ordinary bamboo pole is severed into sections of desired lengths by cutting the pole in twain upon an oblique line at a point approximately midway between its natural joints 4. A ferrule of a size sufficient to encompass the severed ends of the pole sections is then snugly fitted about the terminal of one of the sections 2 so that its oblique end is located approximately midway between the ends of the ferrule. The opposing end of the other section 3 is externally dressed so as to permit sliding movement thereof into the ferrule so that its oblique end fits flat against the oblique end of the opposing pole section. The ferrule is permanently secured to the pole section 2 by a fastener 5 that is made preferably of a wire, one end of which is projected through the ferrule and the pole section, its terminal being backturned and projected inwardly through the ferrule and the adjacent wall of the section thereby to form a clinch 6. The other end portion of the wire has formed therein a coil 7, its terminal end being bent inwardly at right angles to form a latch 8 that is adapted to be projected through an opening 9 made in the ferrule and through an opening 10 made in the section 3 when said section is fully inserted into the ferrule and in abutment with the other section, thus to lock said sections firmly together. As the section 3 is inserted into the ferrule and the ends of the opposing sections approach each other, the one section is caused to turn upon its axis relative to the other until their slanting end faces meet flat against each other, thus the latch opening 10 in the section 3 is guided into alinement with the opening 9 in the ferrule, with which it registers and permits the latch 8 to assume its locking position in the ferrule. The coil 7 serves as a finger hold for manipulating the fastener 5 and also functions as a guide for a fishline (not shown) when the pole is in use.

The structure shown in Fig. 2 includes a ferrule 11 and latch 12 similar to the structure shown in Fig. 1. In this instance, the pole sections 13 and 14 are provided with corresponding dowels 15 and 16 disposed in the bore of said sections. The dowel 15 is secured permanently in place by the lower end of the fastener 12 that is projected through the ferrule, the pole section 13 and the dowel 15, its terminal being turned inwardly and projected through the ferrule, adjacent wall of the section 13 and into the dowel 15, forming a clinch 16'. The abutting ends of the pole sections 13 and 14 and also the corresponding ends of the dowels are oblique and fit against each other when the removable section 14 is in place. A latch opening 17 is provided which extends through one wall of the section 14 and into the dowel 16, which opening becomes alined with a corresponding latch opening 18 made in the ferrule so that when said section is in proper position within the ferrule said latch openings are alined and receive the latch 19, whereby the removable section 14 is locked in operative position. In this form of the invention the dowels are preferably each provided at their far ends with a projection 14'—15' that extends through an opening made in the corresponding natural web 20—21 in the joints 4' of the pole sections. The dowels serve as reinforcements for the ends of the pole sections.

In the form shown in Fig. 3, the base pole section 22 is provided with an oblique end 23 and is secured permanently in the ferrule 24 by the fastener 25 as in the former instance. There is provided in this form a single dowel 26 that extends into the bore of the section 22 and is secured permanently in place together with said section in the ferrule 24 by the fastener 25. The upper end of the dowel is provided with a projection 27 that is received in the opening made in the natural web in the adjacent joint of a removable pole section, not included in the view. In this instance, the removable pole section as it is positioned in the ferrule encompasses the dowel 26 and is secured in position by the latch 17' which projects also into a latch opening 17" made in the dowel that is alined with a latch opening 18' in the ferrule.

In each instance one end of the fastener serves as a means for securing the ferrule permanently in place on one pole section, and its opposite end has engagement with the other pole section when inserted into the ferrule and secures the inserted section removably therein. In this manner the pole sections are firmly held together against both relative longitudinal and turning movements, and are readily disconnected when the latch is withdrawn from its receiving openings.

Variations from the particular construction above disclosed may readily be made by exercise of engineering skill without departure from the spirit or scope of the invention, and the following claims are intended to be inclusive of such variations.

What I claim is:

1. In a tubular pole having axially alined separable sections provided with oblique abutting faces, a dowel disposed permanently in the end portion of one of said sections and extending removably into the bore of the other section when said sections are in proper abutting position, a ferrule in one end of which an end portion of one of said sections is permanently secured and in the opposite end of which an end portion of the other section is removably disposed, and a fastener engageable through openings in the ferrule, the wall of the removable section and said dowel, which openings are alined with each other when said sections are in proper abutting position, thus to secure said sections together and prevent relative turning or axial movement of said sections, the dowel, or the ferrule when the fastener is in engaging position.

2. A pole joint constituted of two separable axially alined pole sections provided with oblique end faces that lie flat against each other when turned to abutting position, a ferrule disposed so as to encompass the end portions of both of said sections when alined in abutting position therein, the opposite ends of said ferrule extending on the respective end portions to corresponding points spaced from said faces, and a spring fastening member one end of which extends through and permanently secures together said ferrule and the end portion of one of said sections and the opposite end of said member being formed to provide a latch, engageable through openings in the ferrule and the other of said sections that are alined when said faces are turned to abutting position, to hold the jointed parts firmly together, the arrangement being such that when the latch is removed from said openings and the sections are relatively turned angularly, endwise movement is imparted outwardly to said other section by relative deflection of said faces.

EDWARD H. KRUSE.